(12) United States Patent
Shi et al.

(10) Patent No.: US 10,198,720 B2
(45) Date of Patent: Feb. 5, 2019

(54) MOBILE DEVICE STAND

(71) Applicant: Capital One Services, LLC, McLean, VA (US)

(72) Inventors: John Shi, Arlington, VA (US); Corey Lee, Vienna, VA (US); Xiaoxue Sherman He, Vienna, VA (US); Sudhir Patni, McLean, VA (US); Blake Castle, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 273 days.

(21) Appl. No.: 14/977,845

(22) Filed: Dec. 22, 2015

(65) Prior Publication Data

US 2016/0178112 A1 Jun. 23, 2016

Related U.S. Application Data

(60) Provisional application No. 62/095,422, filed on Dec. 22, 2014.

(51) Int. Cl.
| | |
|---|---|
| *H04N 7/18* | (2006.01) |
| *G06Q 20/10* | (2012.01) |
| *H04W 4/80* | (2018.01) |
| *F16M 11/10* | (2006.01) |
| *F16M 11/28* | (2006.01) |
| *F16M 13/00* | (2006.01) |
| *H04M 1/04* | (2006.01) |
| *H04M 1/725* | (2006.01) |

(52) U.S. Cl.
CPC .......... *G06Q 20/108* (2013.01); *F16M 11/10* (2013.01); *F16M 11/28* (2013.01); *F16M 13/00* (2013.01); *H04W 4/80* (2018.02); *F16M 2200/028* (2013.01); *H04M 1/04* (2013.01); *H04M 1/7253* (2013.01); *H04M 2250/02* (2013.01); *H04M 2250/52* (2013.01)

(58) Field of Classification Search
CPC ............................. G06Q 20/108; F16M 11/28
USPC .......................................................... 348/150
See application file for complete search history.

(56) References Cited

U.S. PATENT DOCUMENTS

| | | | | |
|---|---|---|---|---|
| 8,233,785 | B1 * | 7/2012 | Surma .................. | G03D 15/005 396/1 |
| 2012/0274842 | A1 * | 11/2012 | Cordes ................... | H04N 7/142 348/373 |

* cited by examiner

*Primary Examiner* — Richard T Torrente
(74) *Attorney, Agent, or Firm* — Troutman Sanders LLP; Christopher J. Forstner; John A. Morrissett

(57) ABSTRACT

A mobile device camera stand includes a flat, planar base comprising a platform for receiving a document, an adjustable shaft projecting from the base at a first end of the shaft, and a flat, planar cradle having a top surface and a bottom surface, the bottom surface connected to a second end of the shaft. The top surface of the cradle receives a mobile device having a camera, and the cradle includes a cutout such that the camera is placed on the cutout such that the cutout does not obstruct the camera, thereby enabling the camera to image the document.

11 Claims, 6 Drawing Sheets

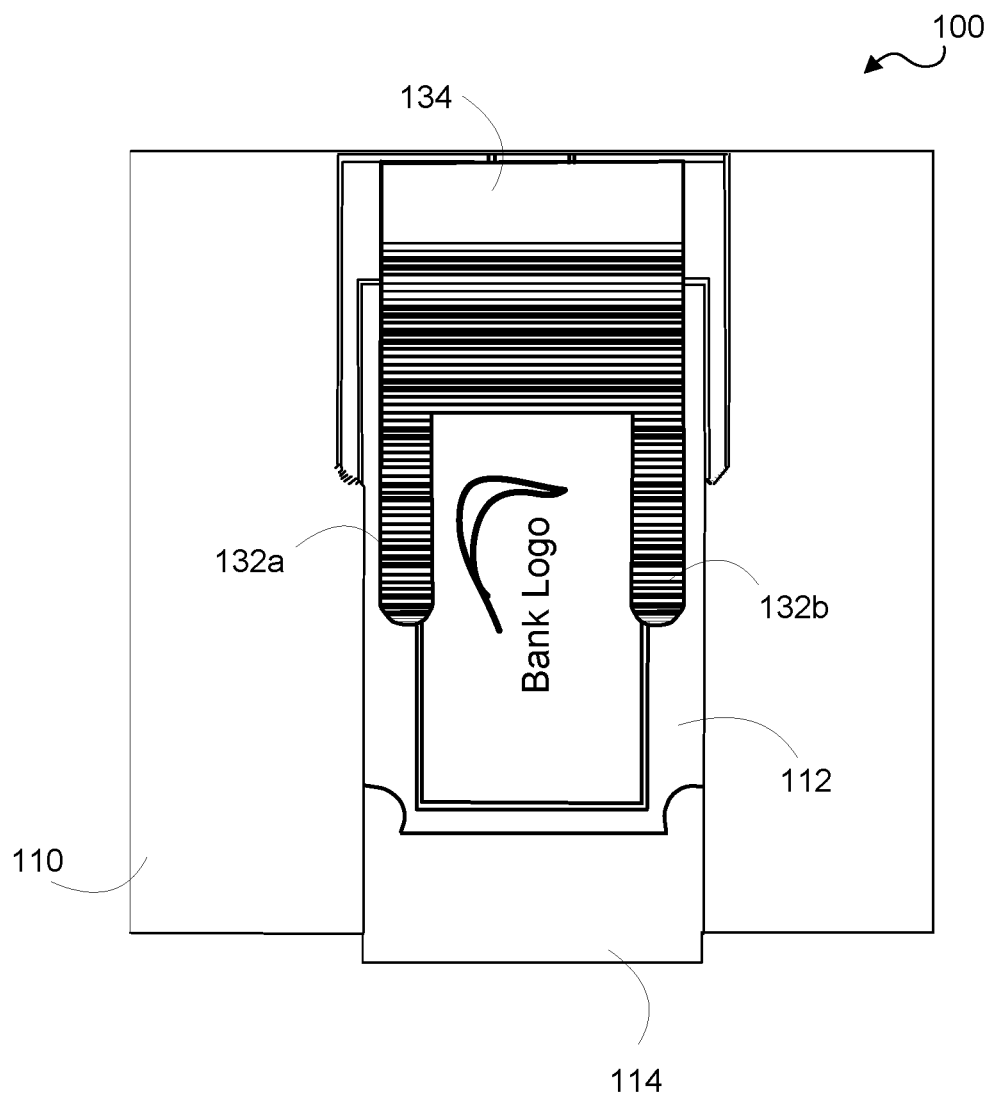

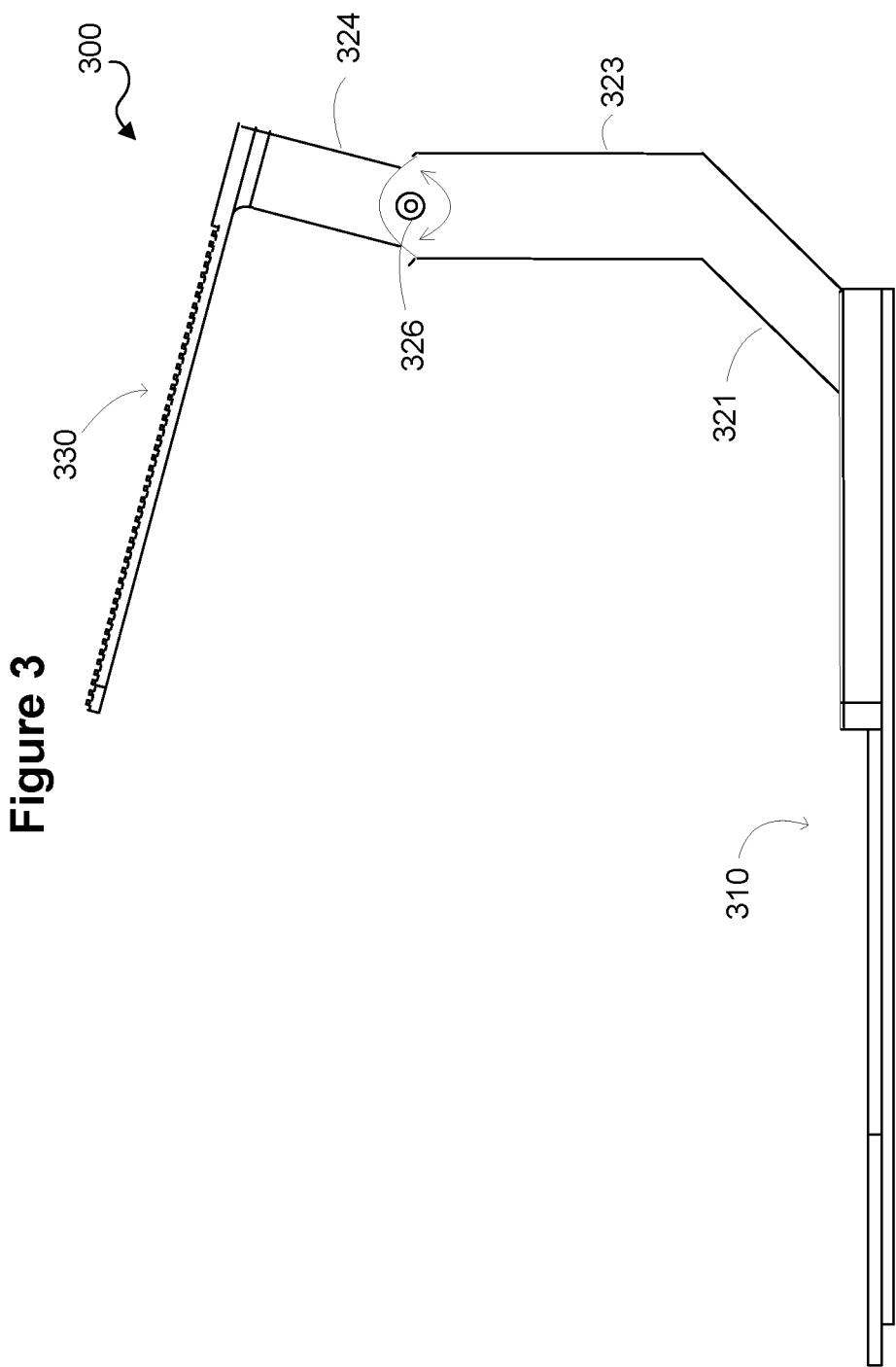

MOBILE DEVICE STAND

CROSS-REFERENCE TO RELATED APPLICATIONS

This application contains subject matter related to and claims the benefit of U.S. Provisional Patent Application No. 62/095,422, filed on Dec. 22, 2014, the entire contents of which is incorporated herein by reference.

FIELD OF THE DISCLOSURE

The present disclosure relates to an elevated stand for a mobile device.

BACKGROUND OF THE DISCLOSURE

Currently, most major financial institutions now offer mobile deposit services to their customers. The customer may take a picture of a check using his mobile device and a mobile banking application provided by his bank, and the bank completes the deposit based on information captured from the digital image of the check. The current problem with mobile deposit through personal smartphones/tablets is that customers have a hard time holding the phone at the right height, angle, and with the ideal background to take a picture of the check. Additionally, any slight movement or shakiness will delay the process or prevent the camera feature from working. As a result, mobile deposits may fail or take too long to process.

These and other drawbacks exist.

SUMMARY OF THE DISCLOSURE

Various example embodiments provide a stand for a mobile device (e.g., a smartphone or tablet). The stand includes a base, a shaft, and a top. The base is designed to receive a check. The base may include markers to indicate where the check should be placed, depending on the size of the check. The shaft projects vertically from the base to a given height. The shaft may comprise a telescopic arrangement to allow for the height of the shaft to be adjusted. The top rests on the end of the shaft opposite the base. The top may comprise a cradle with an opening in the middle. The phone may be placed on the cradle, with the camera portion facing through the opening. The cradle may include markers showing where to place the phone depending on make and model (e.g. iPhone vs. android).

In this way, customers no longer have to estimate the correct height, angle, or background to take the picture of the check. Furthermore, the stand will hold the mobile device steady and prevent any shaking, which is a key factor in successfully completing the mobile deposit process. Additionally, picture taking time decreases due to the faster accuracy. As a result, overall effectiveness will increase.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIGS. 1A-1D depict a mobile device stand, according to an example embodiment of the disclosure;

FIG. 3 depicts a mobile device stand having a top with an adjustable angle, according to an example embodiment of the disclosure.

DETAILED DESCRIPTION OF THE EMBODIMENTS

The following description is intended to convey a thorough understanding of the embodiments described by providing a number of specific example embodiments and details involving a mobile device stand. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. As used herein, the term "mobile device" may include a smartphone, a PDA, a tablet computer, a cellphone, or other mobile communications device. The mobile device may include a camera and a mobile banking application.

Figure 1A:
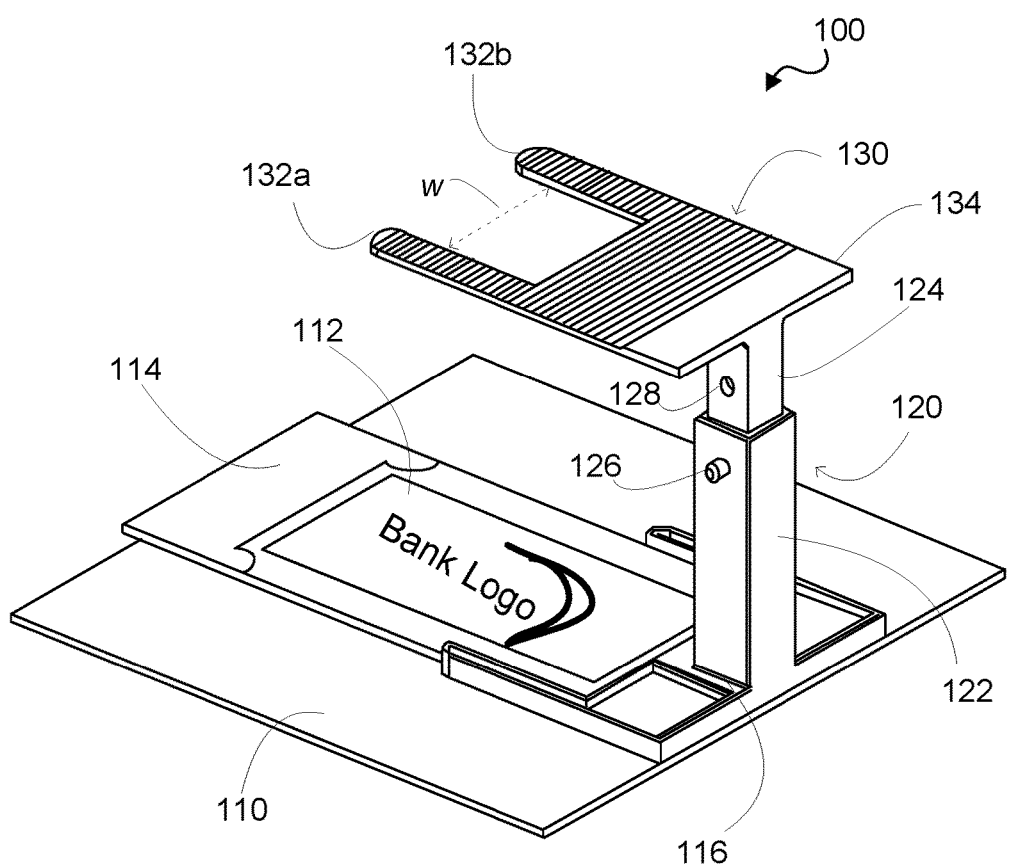

FIGS. 1A-1D depict an example embodiment of a mobile device stand 100. As shown in FIG. 1A, stand 100 may comprise a base 110, a shaft 120, and a cradle 130. In various embodiments, one or more components of stand 100 may be made of hard plastic and/or metal and/or any other suitable material to bear the weight of, for example, the mobile device and maintain structural integrity. As shown in FIG. 1A, the base 110 may comprise a flat, rectangular-shaped piece which supports the shaft 120 and the other components of stand 100. The shaft 120 may be fixed to the base 110 or detachable from the based 110, for storage, for example. The shaft 120 also may collapse towards base 110 using, for example, a hinge-like structure. The base 110 may comprise a platform 112. The platform 112 may include markings and/or an outline on its face showing where a check or other document should be placed by a user. The markings may be dimensioned to the size of a standard bank check. Although the disclosure uses a check as the document to be imaged, the invention applies to all types of documents to be imaged and/or scanned. Base 110 may further comprise an extension piece 114 which may be removeably attachable to one end of platform 112. If a user wishes to place a larger check (or a larger document) that is too big for platform 112, the user may attach extension piece 114 to the end of platform 112, as shown in FIGS. 1A-1D.

Figure 1B:
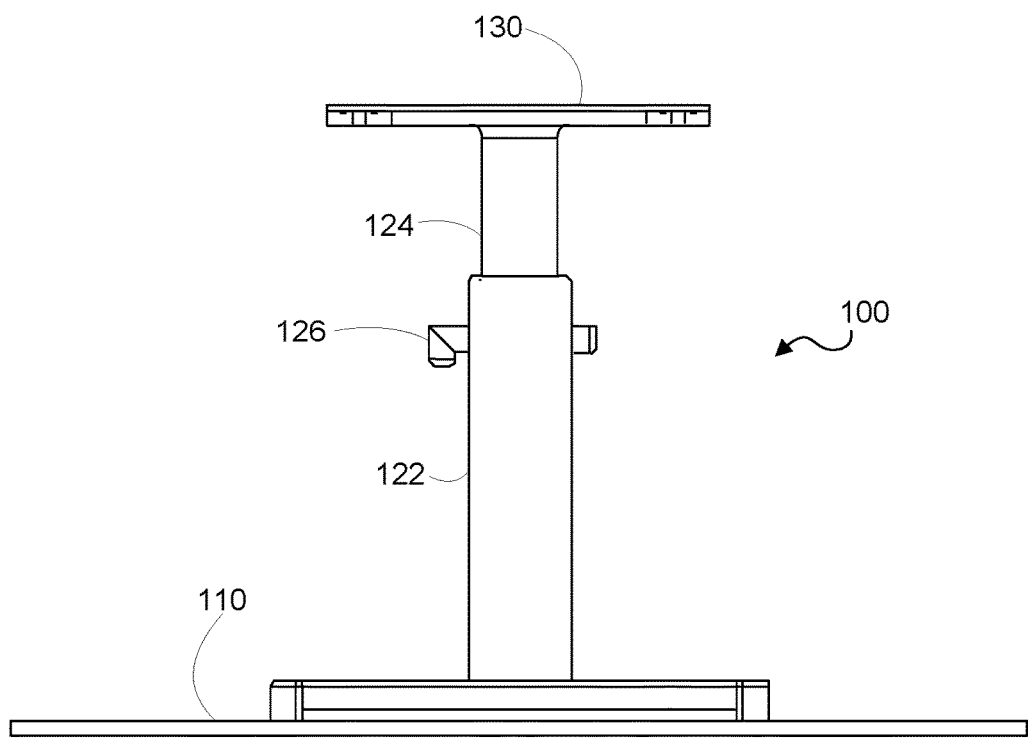
Figure 1C:
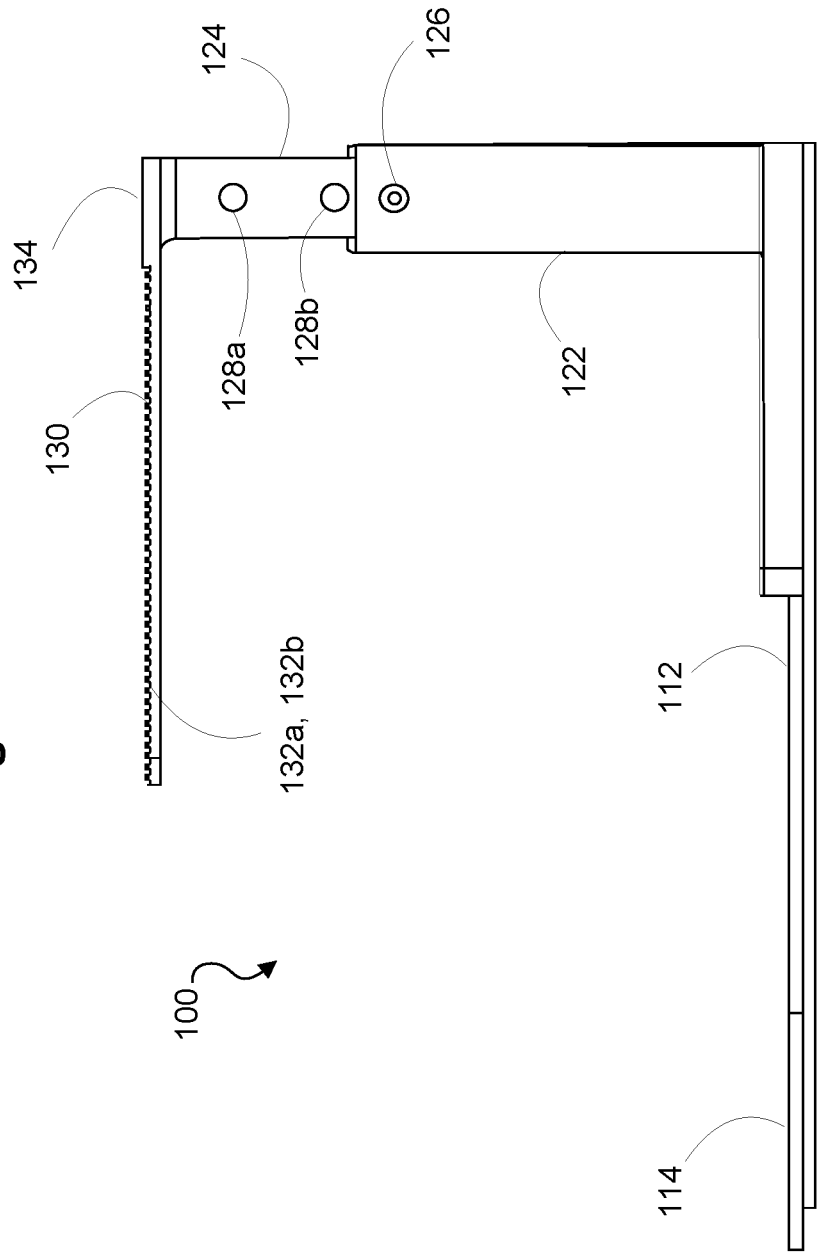

Platform 112 may include logos and engravings of a bank or financial institution (or any other entity). Platform 112 may include raised "rails" that run parallel to the length of platform 112 and are separated by a distance equal to the width of a standard check. In various embodiments, one corner of platform 112 that is closest to shaft 120 may have a raised slot for securing a corner of a check on platform 112. FIG. 1B shows a front view of stand 100, FIG. 1C shows a side view of stand 100, and FIG. 1D shows a top-down view of stand 100.

Shaft 120 may project vertically from base 110 and support cradle 130. In various embodiments, shaft 120, base 110, and cradle 130 may be a single, unitary piece. In various embodiments, such as FIGS. 1A-1D, shaft 120 may comprise lower shaft 122 and upper shaft 124. Lower shaft 122 may be hollow and upper shaft 124 may telescopically fit in lower shaft 122. Lower shaft 122 may be joined to base 110 at connection portion 116. Connection portion 116 may be slightly raised from base 110. Connection portion 116 may include a hinge connecting base 110 to shaft 120, allowing shaft 120 to fold onto base 110.

Lower shaft 122 and upper shaft 124 may have a square cross-section. Lower shaft 122 and upper shaft 124 may have a circular cross-section. In various embodiments, lower shaft 122 and upper shaft 124 may include a pin 126/hole 128 arrangement that allows a user to raise and lower upper shaft 124 to selectively adjust the height of cradle 130. Upper shaft 124 may include multiple holes (e.g., holes 128*a-b* shown in FIG. 1C) in which pin 126 may rest. In various embodiments, upper shaft 124 may be press-fit inside lower shaft 122 and the height of cradle 130 may be continuously adjustable by a user. Other methods for selectively adjusting the height of cradle 130 may be used.

The location of each of holes (or slots) 128*a-n* on upper shaft 124 may be based on the relative distance between cradle 130 and platform 112 when pin 126 is placed in a given hole. For larger checks (or documents) placed on platform 112, cradle 130 may need to be raised to a greater height in order for a mobile device camera to be able to capture the entire document. Additionally, different mobile devices may have differing sizes and camera locations, leading to the need for more holes/slots for a user to select the height of cradle 130. Each of the one or more holes 128*a-n* may be marked to include text describing the type of mobile device that requires the cradle 130 to be at a height associated with that hole and/or the size of the check or document that necessitates the cradle 130 being at a given height.

In various embodiments, lower shaft 122 may include a motor that can automatically raise and lower upper shaft 124. The motor may include discrete settings to adjust the position of upper shaft 124 relative to lower shaft 122. The discrete settings may be based on the size of the mobile device being used, the make and model, the position of the camera on the mobile device, and/or the size of the check or document on platform 112. The motor may include firmware and/or software and a wireless connection (e.g. Bluetooth Low Energy (BLE)), for example, that allows a mobile device to connect to the motor and control movement of, for example, shaft 120. For example, an application executing on a mobile device may allow the mobile device to connect to the motor via Bluetooth and include remote controls to control the movement of the stand. In various embodiments, the motor could receive commands from the remote control (e.g., up/down) and move the stand accordingly.

Cradle 130 may be a planar component that is affixed on one side to the end of upper shaft 124. The connection between cradle 130 and upper shaft 124 may be hinged to allow cradle 130 to fold into shaft 120. In the embodiment shown in FIGS. 1A-1D, cradle 130 extends in a plane parallel to the plane for base 110. In the embodiment shown in FIGS. 1A-1D, one end of upper shaft 124 is affixed to the bottom of cradle 130. In other embodiments, this connection may be hinged to allow cradle 130 to fold towards shaft 120. For stand 100, upper shaft 124 is orthogonal to the bottom surface of cradle 130.

Cradle 130 may comprise prongs 132*a* and 132*b* which project from one end of cradle 130. Cradle 130 may comprise a backstop 134 at the opposite end. Backstop 134 may be a projection that is slightly raised from the top surface of cradle 130. In various embodiments, the top surface of cradle 130 may comprise gripping material (e.g., a rubberized material). In various embodiments, the length of prongs 132*a* and 132*b* may be adjustable (e.g., using a telescopic arrangement). In various embodiments, the prongs 132*a* and 132*b* may project from slots in end of cradle 130 (opposite the backstop 134). The prongs 132*a* and 132*b* may slide in the slots and in this way the portions of prongs 132*a* and 132*b* that project from cradle 130 may be adjustable to accommodate larger mobile devices.

Prongs 132*a* and 132*b* may be separated by width w. The width w between prongs 132*a* and 132*b* may be adjustable depending on the location of the camera on the mobile device and/or the size of the mobile device.

In operation, a user may place a check (or document) on platform 112. The user may then place a mobile device on cradle 130 so that the camera on the mobile device is pointed towards the check and sits in the space between prongs 132*a* and 132*b*. Prongs 132*a* and 132*b* and/or cradle 130 may include grooves or raised projections that define where the mobile device should be placed on the cradle. The gripping material on the top surface of cradle 130 may keep the mobile device from sliding. The end of the device opposite the camera may be abutted against the backstop 134. The user may adjust the height of cradle 130 using the pin 126/slot 128 arrangement on lower shaft 122 and upper shaft 124 based on the position of the camera on the mobile device, the size of the mobile device, and/or the size of the check on platform 112. The user may turn on a banking application on the mobile device and use it to take a picture of the side of the check facing the camera. The banking application may automatically take the picture. The user may then flip over the check, and a second picture of the opposite side of the check may be taken.

In various embodiments, the size of the platform 112 and extension piece 114 may be changed depending on the size of the document being placed on the platform 112 of stand 100. A mobile device placed on stand 110 may be used as a copier and/or scanner for documents placed on the platform 112. The user may set the height of cradle 130 and position the mobile device on cradle 130 so that it does not need to be moved as multiple documents of the same size may be "photocopied."

In various embodiments, stand 100 may include one or more lights on the underside of cradle 130. The lights may include one or more light detection sensors. If the light sensors detect that the ambient light is too low, the lights may be automatically activated to illuminate the check on platform 112. In various embodiments, backstop 134 may include a recharger that plugs into one end of the mobile device when the device is placed on cradle 130. In various embodiments, cradle 130 may have one or more cameras built into the bottom of cradle 130, facing platform 112. The one or more cameras may be connected to a Blue-tooth enabled device on stand 100 which can transmit photos to a mobile device, thus eliminating the need for placing the mobile device on the cradle 130.

Figure 2:
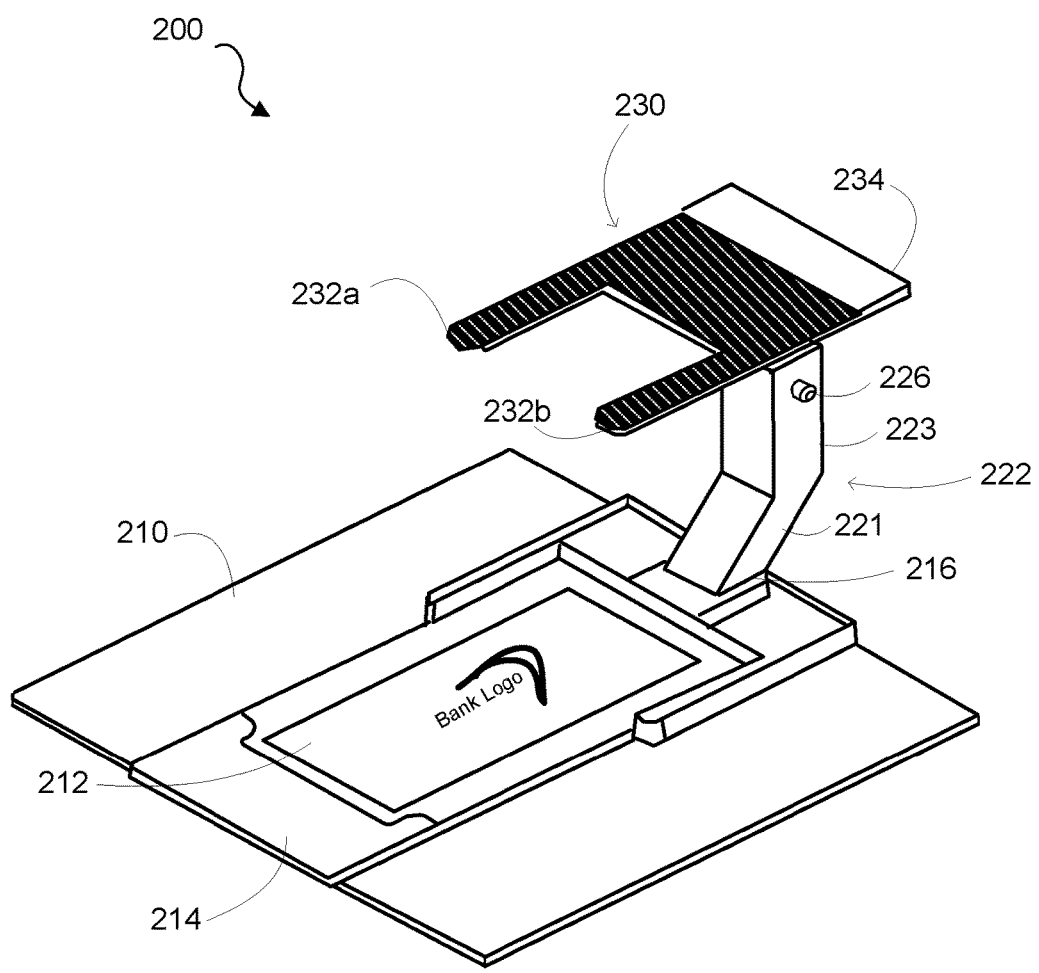
FIG. 2 depicts a mobile device stand; according to an example embodiment of the disclosure.

FIG. 2 depicts an embodiment of stand 200. Stand 200 may include similar components as stand 100. As shown in FIG. 2, stand 200 may include lower shaft 222, which has an elbow joint connecting a first portion 221 and a second portion 223. The first portion 221 may project from connection portion 216 at an obtuse angle relative to the platform 212. In various embodiments, the angle may be 135°. The second portion 223 may project vertically at the elbow of lower shaft 222. In this way, cradle 230 may not cast a shadow on platform 212. As discussed above, a motor and corresponding remote control via a mobile device may be included.

FIG. 3 depicts an embodiment of stand 300. Stand 300 may include many of the same components as stand 100. As shown in FIG. 3, stand 300 may include pivot 326 that connects upper shaft 324 to second portion 323 of lower shaft 322. A user may be able to adjust the angle of cradle 330 relative to base 310 by pivoting upper shaft 324 about pivot 326. The inside of pivot 326 may include notches to allow the user to selectively set the angle of cradle 330. In this way, the user may adjust the angle of cradle 330 to accommodate a mobile device that may be too long for cradle 330 and/or a larger check or document on base 310.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A device comprising:
    a flat, planar base comprising a platform for receiving a document;
    an adjustable shaft comprising a first end and a second end, the first end connected to the base;
    a motor configured to automatically adjust the adjustable shaft, the motor comprising a wireless communication device configured to wirelessly connect the motor to a mobile device including a camera and a mobile application configured to remotely adjust the adjustable shaft; and
    a flat, planar cradle comprising:
        a body comprising:
            a top surface configured to receive the mobile device;
            a bottom surface connected to the second end of the shaft; and
            a first prong and a second prong, the first and second prongs (i) integrally connected to the body and extending planarly from the body of the cradle and parallel to the base and (ii) defining a cutout, such that, when the mobile device is placed on the cradle, the camera is aligned with the cutout such that the camera is unobstructed by the cradle and is enabled to capture an image of the document.

2. The device of claim 1, wherein the mobile application is configured to transmit control commands to the wireless communication device of the motor.

3. The device of claim 1, wherein the wireless communication device is operable to wirelessly connect to the mobile device via a Bluetooth Low Energy connection.

4. The device of claim 1, wherein the shaft comprises a lower portion attached to the platform, and an upper portion telescopically arranged within the lower portion and attached to the cradle, wherein a position of the upper portion relative to the lower portion is selectively adjustable.

5. The device of claim 4, wherein the cradle is a rectangular cradle having a first end and a second end, the first end connected to the upper portion of the shaft and wherein the first and second prongs are parallel and project from the second end of the body of the cradle, and wherein at least a portion of the top surface of the cradle further comprises a gripping material.

6. The device of claim 1, wherein the top surface includes a non-slip surface that prevents the mobile device from disengaging from the cradle.

7. The device of claim 1, wherein the adjustable shaft is configured to collapse towards the base for storage.

8. The device of claim 1, wherein the platform is a rectangular platform for receiving the document, the document including a bank check.

9. A method for capturing an image of a check, the method comprising:
    receiving the check on a device comprising:
        a flat, planar base comprising a platform for receiving a document;
        an adjustable shaft comprising:
            a first end and a second end, the first end connected to the base;
            a lower portion attached to the platform; and
            an upper portion telescopically arranged within the lower portion and attached to the cradle, wherein a position of the upper portion relative to the lower portion is selectively adjustable; and
        a flat, planar cradle comprising:
            a body;
            a top surface;
            a bottom surface connected to the second end of the shaft;
            a first prong; and
            a second prong, the first and second prongs integrally connected to, and extending planarly from, the body, the first and second prongs defining a cutout;
    receiving, on the top surface of the cradle, a mobile device having a camera such that the camera is positioned in the cutout;
    automatically adjusting a position of the cradle relative to the base by controlling a height of the adjustable shaft, wherein the automatic adjusting is based on at least one of the size of the check, the size of the mobile device, and the position of the camera on the mobile device; and
    activating an application on the mobile device to capture an image of the check.

10. The method of claim 9, wherein the device comprises:
    a motor comprising a wireless communication device configured to wirelessly connect the motor to the mobile device, wherein the mobile device includes a mobile application configured to remotely adjust the adjustable shaft.

11. The method of claim 10, further comprising receiving, by the wireless communication device, instructions to adjust the adjustable shaft, the instructions generated based on one or more settings stored on the mobile device.

* * * * *